Nov. 28, 1950 W. OTT 2,531,583
ROENTGEN-RAY APPARATUS
Filed Oct. 5, 1948 2 Sheets-Sheet 1

INVENTOR
WALTER OTT,

BY *E. L. Winterroth*
ATTORNEY

Nov. 28, 1950 W. OTT 2,531,583
ROENTGEN-RAY APPARATUS
Filed Oct. 5, 1948 2 Sheets—Sheet 2
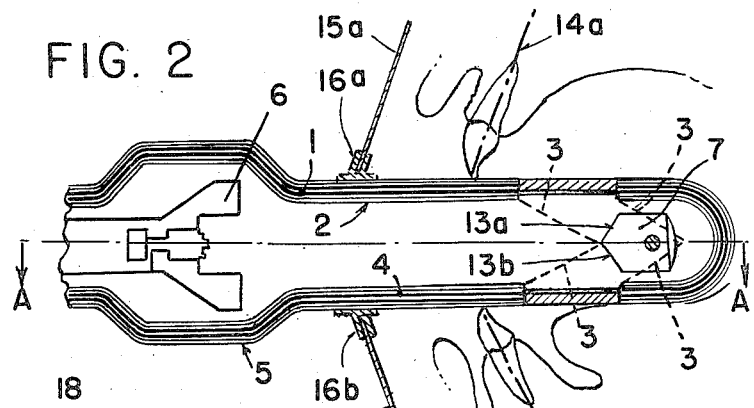
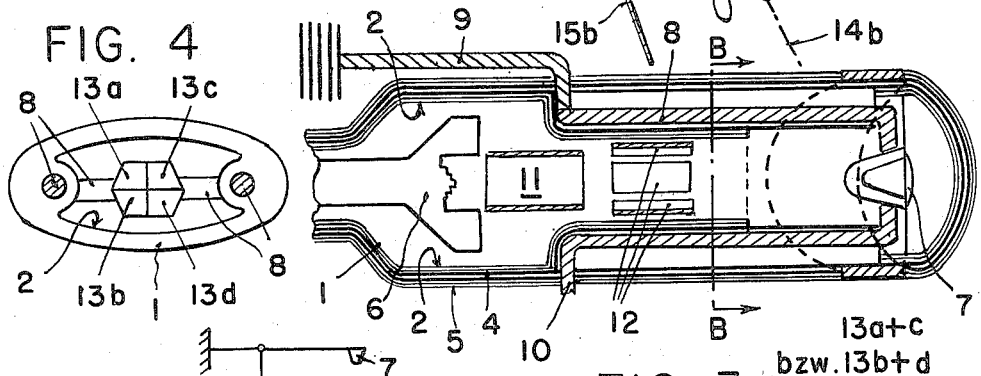
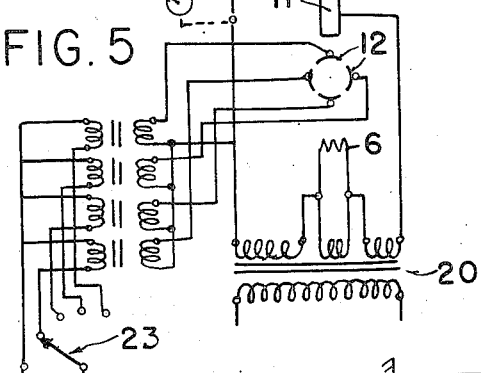
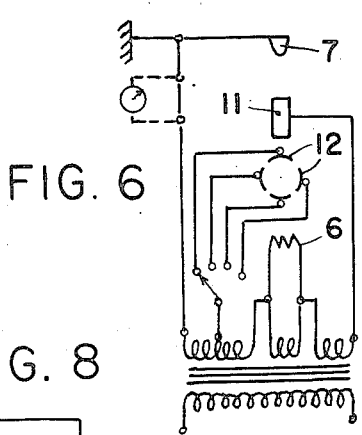
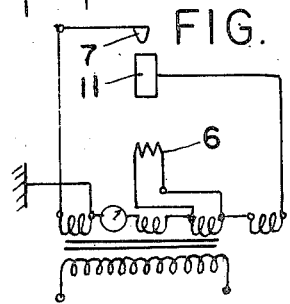
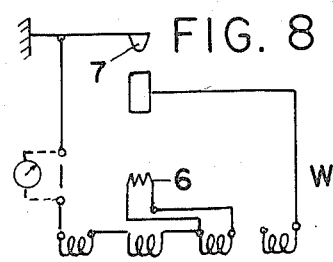
INVENTOR
WALTER OTT,
BY
ATTORNEY Patented Nov. 28, 1950

2,531,583

UNITED STATES PATENT OFFICE 2,531,583

ROENTGEN-RAY APPARATUS

Walter Ott, Bern, Switzerland

Application October 5, 1948, Serial No. 52,917
In Switzerland February 11, 1947

6 Claims. (Cl. 250—149)

1

The present invention relates to a Röntgen-ray apparatus especially for intracavernous radiographs, being in its essence characterized by means adapted adjustably to direct the electron rays on to the anticathode for the purpose of producing X-rays which are variable both in the magnitude of the beam angles and in the direction of the central radiations. Thereby means may well be provided for varying the size and shape of the focus.

The X-ray apparatus according to the invention comprises not only means for adjustably directing the cathodic rays on to the anticathode, but also means for varying the focus and density of the rays, whereby the means for varying the focus may include deflection plates or electromagnetic fields and a special design of the anticathode. The means for changing the density of the rays may consist of means adapted to vary the diameter of the focus, thus making it possible with the same tube to operate with fine and coarse focus.

By varying the position and shape of the focus both by means of the action of the control fields as well as by the design or form of the anticathode, a selective alteration of the X-ray system is accomplished which is essential for certain radiographs. Thus by definitely formed deflection faces of the anticathode the rays acting upon carriers of sensitive photographic films may be directed in a definite way.

Further features of the invention will appear from the claims, description and drawing in which the invention is represented as applied to an X-ray apparatus with dental tube.

Fig. 2 shows a longitudinal section of a dental tube seen laterally as introduced into the mouth of a patient;

Fig. 3 is a horizontal section of the tube taken on the line A—A of Fig. 2;

Fig. 4 is a sectional view taken on the line B—B of Fig. 3;

Figs. 5 to 12 illustrate some various possible ways of connecting or wiring the X-ray apparatus.

Figure 1:
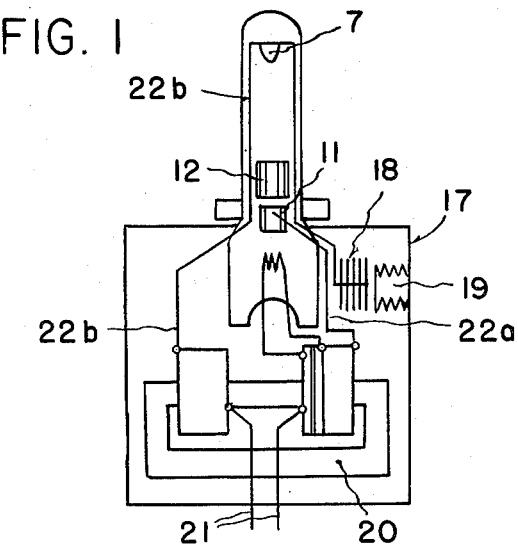
Fig. 1 shows the diagram of the X-ray apparatus with casing of insulating material and tube mounted thereon.

For the purpose of taking intracavernous radiographs the tube of the X-ray apparatus consists of a tube suited to the caverna and with the anticathode arranged at the introduction end and so shaped that the rays deflected therefrom strike a film carrier arranged outside the caverna. Consequently the rays of the X-ray apparatus as

2 per invention are emitted from inside the hollow space to the outside on a film carrier.

Such a tube is illustrated in Figs. 2, 3 and 4, the tube in this case being of the dental type to take X-ray pictures of the lower and/or upper jaws or the teeth.

As will be seen from Figs. 2, 3 and 4, the tube consists of a hollow body of rectangular rounded cross-section, which is introduced into the mouth of the patient in such a way that he can hold the tube by his teeth on the broad sides as shown in Fig. 2 by indication of the section contour of the upper and lower jaws.

The tube itself consists of a quartz body 1 having a complete internal silvering 2, except at the exit 3 of the rays, and a lead-alloy lining 4 thereover, the whole tube being covered with a high-tension insulating substance 5. The rear portion of the tube houses the cathode 6, while the anticathode 7 is located at its forward end. The anticathode is fixed to a metal body 8 with two ends 9 and 10 brought out of the tube. Between cathode 6 and anticathode 7 there are an electrostatic ray lens 11 and four circularly arranged deflection plates 12. Instead of deflection plates 12 and lens 11 electromagnetic fields produced by coils 12a and an electromagnetic ray lens (Figs. 11 and 12) may be used.

The anticathode has a special shape in that it possesses four deflection planes or faces 13a, 13b, 13c, 13d arranged in various directions at an inclination to the tube axis, hence projecting the central ray perpendicularly to the tooth axis 14a or 14b and consequently on to the film 15a or 15b, according as the electron ray is directed on to the deflection planes 13a, 13b, 13c or 13d and according to the combination of the control action of the deflection plates 12, whereby nine various possibilities are given. The electron rays may namely be focussed on to each of the four deflection planes or on to the four edges each formed of two adjacent planes or faces, or also on to the common point of intersection of the four planes. The film strips 15a and 15b may be inserted into holders 16a and 16b so provided as to be displaceable on the tube. These films 15a, 15b may consist of complete strips covering the whole upper or lower jaw.

By suitable design of the tube and appropriate shape of the anticathode with its deflection planes and of the exit points of the rays, X-ray apparatuses may be constructed for all requirements of intracavernous radiographs.

The tube according to Figs. 2 to 4 and as shown in Fig. 1 is connected to a casing 17 containing, for instance, an oil bath as an insulating substance. One end 9 of the metal body 8 is connected to a cooler 18. A pressure equalizer 19 continuously adapts the volume of the casing to the expansion of its content due to temperature.

The casing 17 accommodates, for instance, a transformer 20 with primary winding 21 and secondary windings 22a and 22b together with a heating filament 23 for the cathode 6. The ray lens 11 is connected to the bringing out of the secondary winding 22a, while the bringing out of the other secondary winding 22b is connected to the anticathode.

Obviously, various connections are possible which in fundamentals are represented by Figs. 5 to 12. Fig. 5 shows a form of embodiment of the X-ray apparatus having four deflection plates so arranged as to be switched on and off from outside the tube by a selective switch 23.

Fig. 6 exhibits a form of a connection likewise provided with four deflection plates 12 to be switched on and off within the tube or apparatus, for instance, by a relay control.

Figs. 7 and 8 show wiring examples respecting the potential relationship between cathode, anticathode and casing of the apparatus. Thus, for instance, in the connection according to Fig. 6 the potential between anticathode 7 and cathode 6 amounts to 70 kv., the anticathode carrying +35 kv. and the cathode −35 kv. with respect to the casing of the apparatus (earth). In the example according to Fig. 8 the anticathode has the same potential as the casing, i. e. ±0, while the cathode has a potential of −70 kv.

By corresponding electric control of the deflection plates 12 in conjunction with the electric lens 11, various alterations of the radiation ratios may be obtained to suit the radiographs to be made. The X-ray apparatus according to the invention may be used as an all-purpose tube with controllable focus and as a special tube for intracavernous pictures, thus also for gynaecology, skull radiographs as a dental tube and also for mass radiography.

Figs. 9 to 12 represent further wiring possibilities with other switching elements.

Figure 9:
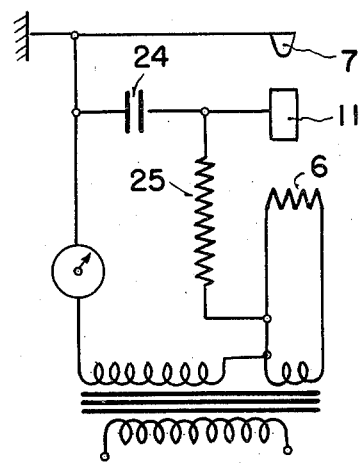
Figure 10:
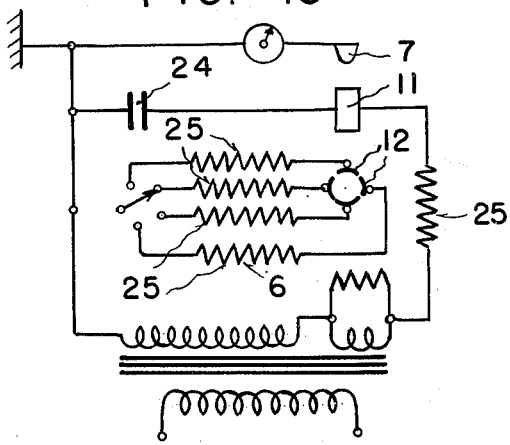

With reference to Figs. 9 and 10, condensers 24 are, for instance, combined with resistances 25 to by-pass the auxiliary coil, the condenser 24 being connected to the same pole as the anticathode 7, and the resistance 25 to cathode 6. The control potential is then determined by allocating corresponding magnitudes to these switching elements.

Figure 11:
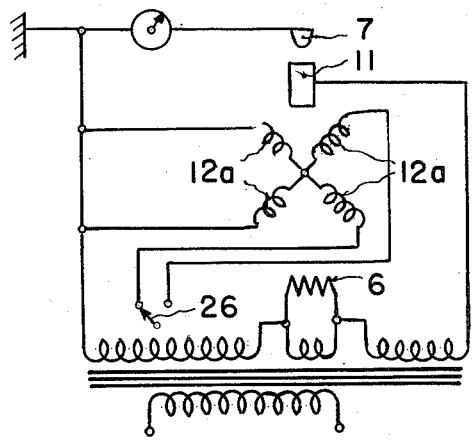
Figure 12:
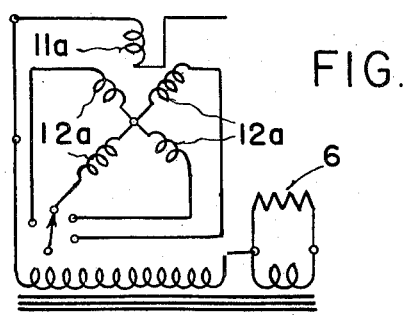

Figs. 11 and 12 represent an example of electromagnetic deflection by the coils 12a.

In the example according to Fig. 11 only two coils 12a are controlled by the switch 26, while the other coils 12a are kept constant. This is possible if the coils which are kept constant first direct the electron beam to the side, which action may be nullified by the controllable coils or even overcompensated, whereby the beam may be directed in any direction.

In Fig. 12 an electromagnetic lens 11a is substituted for the electrostatic beam lens 11.

The X-ray apparatus may advantageously also be operated under high-frequency, thus providing a safety measure against high-voltage. The operation under high-frequency may be based on spark gaps, standard thermionic valves or such of a special design (clystron, rhumbatron, by modulation of the electron velocity) possibly with multiplier.

What I claim is:

1. In Roentgen apparatus including a tube, especially for intracavernous radiographs, a cathode and an anode in said tube, said anode having a plurality of target planes thereon which are inclined in different directions relative to the tube axis and relative to one another, means for changing the form and magnitude of the focus of an electron beam, and a deflection system in said tube whereby the electron beam can be deflected to different ones of said target planes of the anode, in order to produce Roentgen rays emanating selectively in different directions, and wherein for taking intracavernous pictures the tube is of a shape corresponding to the caverna, the anode being stationary and arranged to emit X-rays produced thereby to fall on a film carrier arranged outside the caverna.

2. In Roentgen apparatus including a tube, especially for intracavernous radiographs, a cathode and an anode in said tube, said anode having a plurality of target planes thereon which are inclined in different directions relative to the tube axis and relative to one another, means for changing the form and magnitude of the focus of an electron beam, and a deflection system in said tube whereby the electron beam can be deflected to different ones of said target planes of the anode, in order to produce Roentgen rays emanating selectively in different directions, said tube serving for intracavernous radiographs consisting of quartz having an inner silver coating to deflect the secondary electrons and an outer lead-alloy lining, the whole being covered by a high-tension insulating substance.

3. Roentgen apparatus according to claim 2, said quartz shell and the lead-alloy lining having a layer arranged therebetween to equalize the pressure at temperature variations.

4. In Roentgen apparatus including a tube, especially for intracavernous radiographs, a cathode and an anode in said tube, said anode having a plurality of target planes thereon which are inclined in different directions relative to the tube axis and relative to one another, means for changing the form and magnitude of the focus of an electron beam, and a deflection system in said tube whereby the electron beam can be deflected to different ones of said target planes of the anode, in order to produce Roentgen rays emanating selectively in different directions, said anode being fixed to a quartz-insulated electrically and thermally conducting body at least with one end which is brought out of the tube.

5. In Roentgen apparatus including a tube, especially for intracavernous radiographs, a cathode and an anode in said tube, said anode having a plurality of target planes thereon which are inclined in different directions relative to the tube axis and relative to one another, means for changing the form and magnitude of the focus of an electron beam, and a deflection system in said tube whereby the electron beam can be deflected to different ones of said target planes of the anode, in order to produce Roentgen rays emanating selectively in different directions, a transformer in said tube, said transformer having a primary and secondary winding, an auxiliary coil and heating filament in said tube, a lead from said secondary winding leading over the quartz insulated fixture to said anode, said means for changing the form and magnitude of the focus of the electron beam, comprising a beam lens, said auxiliary coil being connected to said beam lens, and a cooling element connected to the end of said tube.

6. In Roentgen apparatus including a tube, especially for intracavernous radiographs, a cathode and an anode in said tube, said anode having a plurality of target planes thereon which are inclined in different directions relative to the tube axis and relative to one another, means for changing the form and magnitude of the focus of an electron beam, and a deflection system in said tube whereby the electron beam can be deflected to different ones of said target planes of the anode, in order to produce Roentgen rays emanating selectively in different directions, the control of said deflection system taking place within said tube by proper phase connection to a transformer, and including a condenser connected to the same pole as said anode, resistances combined with said condensers, an auxiliary coil, said condenser and said resistances in combination bypassing said auxiliary coil, the proper phase connection being regulatable by proper dimensioning of said condenser and resistances.

WALTER OTT.

REFERENCES CITED

The following references are of record in the file of this patent:

UNITED STATES PATENTS

| Number | Name | Date |
|---|---|---|
| 1,946,288 | Kearsley | Feb. 6, 1934 |
| 1,977,398 | Morrison | Oct. 16, 1934 |
| 2,081,077 | Wantz | May 18, 1937 |
| 2,240,120 | Nicoll | Apr. 29, 1941 |
| 2,316,214 | Atlee et al. | Apr. 13, 1943 |
| 2,329,318 | Atlee et al. | Sept. 14, 1943 |
| 2,356,645 | Atlee et al. | Aug. 22, 1944 |

FOREIGN PATENTS

| Number | Country | Date |
|---|---|---|
| 162,842 | Switzerland | Aug. 29, 1931 |